(12) United States Patent
Soon-Shiong

(10) Patent No.: US 12,386,497 B2
(45) Date of Patent: Aug. 12, 2025

(54) SHARED REAL-TIME CONTENT EDITING ACTIVATED BY AN IMAGE

(71) Applicant: Nant Holdings IP, LLC, Culver City, CA (US)

(72) Inventor: Patrick Soon-Shiong, Los Angeles, CA (US)

(73) Assignee: Nant Holdings IP, LLC, Culver City, CA (US)

( * ) Notice: Subject to any disclaimer, the term of this patent is extended or adjusted under 35 U.S.C. 154(b) by 0 days.

(21) Appl. No.: 18/516,893

(22) Filed: Nov. 21, 2023

(65) Prior Publication Data

US 2024/0094892 A1  Mar. 21, 2024

Related U.S. Application Data

(63) Continuation of application No. 17/990,643, filed on Nov. 18, 2022, now Pat. No. 11,861,154, which is a
(Continued)

(51) Int. Cl.
*G06F 3/04847* (2022.01)
*G06F 3/03* (2006.01)
(Continued)

(52) U.S. Cl.
CPC ............ *G06F 3/04847* (2013.01); *G06F 3/03* (2013.01); *G06F 3/048* (2013.01); *H04L 65/4015* (2013.01); *H04L 67/12* (2013.01)

(58) Field of Classification Search
None
See application file for complete search history.

(56) References Cited

U.S. PATENT DOCUMENTS

| 7,016,532 B2 | 3/2006 | Boncyk et al. |
| 7,162,690 B2 * | 1/2007 | Gupta ................ G06F 16/4387 715/202 |

(Continued)

FOREIGN PATENT DOCUMENTS

| CA | 2 547 468 A1 | 5/2005 |
| CA | 2881533 A1 | 8/2011 |

(Continued)

OTHER PUBLICATIONS

"Advantages and Implementation of HP Remote Graphics Software," Hewlett Packard, http://h20331.www2.hp.com/Hpsub/downloads/hp_remotegraphics.pdf, 11 pages.
(Continued)

*Primary Examiner* — Phyllis A Book
(74) *Attorney, Agent, or Firm* — Maschoff Brennan; Andrew A. Noble

(57) ABSTRACT

Systems and methods for instantiating collaboration interfaces via object recognition are disclosed. An object recognition engine communicatively coupled to a database and an electronic device receives sensor data related to an object and identifies an object characteristic. A component is selected having criteria satisfied by the object characteristic and a collaboration interface is instantiated on the electronic device. This can allow a user to edit content related to an object. A substantially identical collaboration interface can be instantiated on a second electronic device to allow collaboration among user with respect to content related to the object.

23 Claims, 3 Drawing Sheets

Related U.S. Application Data continuation of application No. 17/556,538, filed on Dec. 20, 2021, now Pat. No. 11,543,953, which is a continuation of application No. 17/112,830, filed on Dec. 4, 2020, now Pat. No. 11,237,715, which is a continuation of application No. 15/843,918, filed on Dec. 15, 2017, now Pat. No. 10,891,039, which is a continuation of application No. 15/591,017, filed on May 9, 2017, now Pat. No. 9,857,964, which is a continuation of application No. 14/155,252, filed on Jan. 14, 2014, now Pat. No. 9,678,617.

(60) Provisional application No. 61/752,091, filed on Jan. 14, 2013.

(51) Int. Cl.
| | | |
|---|---|---|
| *G06F 3/048* | (2013.01) | |
| *H04L 65/401* | (2022.01) | |
| *H04L 67/12* | (2022.01) | |

(56) References Cited

U.S. PATENT DOCUMENTS

| | | | |
|---|---|---|---|
| 7,242,988 B1 | 7/2007 | Hoffberg et al. | |
| 7,379,047 B2 | 5/2008 | Drucker et al. | |
| 7,403,652 B2 | 7/2008 | Boncyk et al. | |
| 7,477,780 B2 | 1/2009 | Boncyk et al. | |
| 7,493,243 B2 | 2/2009 | Choi et al. | |
| 7,564,469 B2 | 7/2009 | Cohen | |
| 7,565,008 B2 | 7/2009 | Boncyk et al. | |
| 7,613,630 B2* | 11/2009 | Wolinsky | H04N 21/812 |
| | | | 705/37 |
| 7,680,324 B2 | 3/2010 | Boncyk et al. | |
| 7,739,599 B2 | 6/2010 | Patten et al. | |
| 7,775,437 B2 | 8/2010 | Cohen | |
| 7,831,246 B1 | 11/2010 | Smith et al. | |
| 7,881,529 B2 | 2/2011 | Boncyk et al. | |
| 7,899,243 B2 | 3/2011 | Boncyk et al. | |
| 7,899,252 B2 | 3/2011 | Boncyk et al. | |
| 8,229,715 B1 | 7/2012 | Teller et al. | |
| 8,280,949 B2 | 10/2012 | Bergquist et al. | |
| 8,332,470 B2 | 12/2012 | Arun et al. | |
| 8,340,651 B1 | 12/2012 | Gailloux et al. | |
| 8,484,561 B1* | 7/2013 | Lemonik | G06F 40/166 |
| | | | 715/255 |
| 8,523,682 B2 | 9/2013 | Bickley | |
| 8,684,839 B2 | 4/2014 | Mattice et al. | |
| 8,819,536 B1 | 8/2014 | Lucovsky et al. | |
| 9,498,720 B2* | 11/2016 | Geisner | A63F 13/75 |
| 9,678,617 B2 | 6/2017 | Soon-Shiong | |
| 9,857,964 B2 | 1/2018 | Soon-Shiong | |
| 10,740,974 B1 | 8/2020 | Cowburn et al. | |
| 10,891,039 B2 | 1/2021 | Soon-Shiong | |
| 11,237,715 B2 | 2/2022 | Soon-Shiong | |
| 11,543,953 B2 | 1/2023 | Soon-Shiong | |
| 11,861,154 B2 | 1/2024 | Soon-Shiong | |
| 2002/0010734 A1* | 1/2002 | Ebersole | H04L 67/12 |
| | | | 709/201 |
| 2002/0164858 A1 | 11/2002 | Sayama et al. | |
| 2003/0177187 A1* | 9/2003 | Levine | H04L 67/52 |
| | | | 709/205 |
| 2004/0121786 A1* | 6/2004 | Radcliffe | H04L 9/40 |
| | | | 455/500 |
| 2004/0260669 A1 | 12/2004 | Fernandez | |
| 2006/0252530 A1 | 11/2006 | Oberberger et al. | |
| 2007/0021198 A1 | 1/2007 | Muir et al. | |
| 2007/0043843 A1* | 2/2007 | Devereaux | H04N 7/152 |
| | | | 709/223 |
| 2007/0124374 A1 | 5/2007 | Arun et al. | |
| 2007/0250840 A1 | 10/2007 | Coker et al. | |
| 2008/0207296 A1 | 8/2008 | Lutnick et al. | |
| 2009/0029766 A1 | 1/2009 | Lutnick et al. | |
| 2009/0054123 A1 | 2/2009 | Mityagin et al. | |
| 2009/0119731 A1 | 5/2009 | Perlman et al. | |
| 2009/0156303 A1 | 6/2009 | Kiely et al. | |
| 2009/0305218 A1 | 12/2009 | Dozier et al. | |
| 2010/0124983 A1 | 5/2010 | Gowin et al. | |
| 2010/0141554 A1* | 6/2010 | Devereaux | H04N 7/152 |
| | | | 455/66.1 |
| 2010/0162131 A1 | 6/2010 | Gaillard et al. | |
| 2010/0169269 A1 | 7/2010 | Chandrasekaran | |
| 2011/0060729 A1 | 3/2011 | Marquez et al. | |
| 2011/0105226 A1 | 5/2011 | Perlman | |
| 2011/0134204 A1* | 6/2011 | Rodriguez | G06Q 10/10 |
| | | | 704/E21.001 |
| 2011/0170004 A1* | 7/2011 | Nunes | H04L 69/28 |
| | | | 348/E5.009 |
| 2011/0225200 A1 | 9/2011 | Danis et al. | |
| 2011/0239135 A1 | 9/2011 | Spataro et al. | |
| 2012/0058814 A1 | 3/2012 | Lutnick et al. | |
| 2012/0078802 A1 | 3/2012 | Kieselbach | |
| 2012/0086727 A1* | 4/2012 | Korah | G06F 3/03 |
| | | | 345/633 |
| 2012/0254040 A1 | 10/2012 | Dixon et al. | |
| 2012/0295717 A1 | 11/2012 | Belz et al. | |
| 2012/0324353 A1 | 12/2012 | Torbey et al. | |
| 2013/0027404 A1 | 1/2013 | Sarnoff | |
| 2013/0035158 A1 | 2/2013 | Osvald et al. | |
| 2013/0065668 A1 | 3/2013 | Lemay et al. | |
| 2013/0079128 A1 | 3/2013 | Thomas et al. | |
| 2013/0116044 A1 | 5/2013 | Schwartz | |
| 2013/0144950 A1 | 6/2013 | Sanakaranarasimhan et al. | |
| 2013/0165215 A1* | 6/2013 | Arezina | G07F 17/322 |
| | | | 463/25 |
| 2013/0201215 A1* | 8/2013 | Martellaro | G09G 5/00 |
| | | | 345/633 |
| 2013/0278631 A1 | 10/2013 | Border et al. | |
| 2013/0326376 A1 | 12/2013 | Stachniak et al. | |
| 2014/0006660 A1* | 1/2014 | Frei | H04L 43/10 |
| | | | 710/104 |
| 2014/0173457 A1 | 6/2014 | Wang et al. | |

FOREIGN PATENT DOCUMENTS

| | | | | |
|---|---|---|---|---|
| CN | 101179629 A | | 5/2008 | |
| EP | 2 458 537 A1 | | 5/2012 | |
| WO | 03/81447 A1 | | 10/2003 | |
| WO | 2010/039414 A1 | | 4/2010 | |
| WO | WO-2012061760 A2 * | | 5/2012 | G06F 16/433 |

OTHER PUBLICATIONS

"Live Online Video Technical Support From LiveTechTM," LIVETECH, http://livetechsite.com, 1 page.

Boring et al., "Multi-User Interaction on Media Facades Through Live Video on Mobile Devices," Proceedings of the SIGCHI conference on human factors in computing systems, 2011, pp. 2721-2724.

"Team Whiteboarding With Twiddla—Painless Team Collaboration for the Web," Twiddla, http://www.twiddla.com/, 1 page.

"VYEW Product Features," VYEW, http://vyew.com/site/product, 2 pages.

Wallace et al., "Virtually Shared Displays and User Input Devices," USENIX Annual Technical Conference, 2007, vol. 7, pp. 375-380.

* cited by examiner

SHARED REAL-TIME CONTENT EDITING ACTIVATED BY AN IMAGE

This application is a continuation of U.S. application Ser. No. 17/990,643, filed on Nov. 18, 2022, which is a continuation of U.S. application Ser. No. 17/556,538, filed on Dec. 20, 2021, which is a continuation of U.S. application Ser. No. 17/112,830, filed on Dec. 4, 2020, which is a continuation of U.S. application Ser. No. 15/843,918, filed on Dec. 15, 2017, which is a continuation of U.S. application Ser. No. 15/591,017, filed on May 9, 2017, which is a continuation of U.S. application Ser. No. 14/155,252, filed on Jan. 14, 2014, which claims priority to U.S. Provisional Application No. 61/752,091, filed on Jan. 14, 2013. These and all other referenced extrinsic materials are incorporated herein by reference in their entirety.

FIELD OF THE INVENTION

The field of the invention is collaboration system technologies.

BACKGROUND

The following description includes information that may be useful in understanding the present invention. It is not an admission that any of the information provided herein is prior art or relevant to the presently claimed invention, or that any publication specifically or implicitly referenced is prior art.

As advances in technology continue to be developed, the utilization of collaboration systems has become increasingly important in education, work, and entertainment environments. Existing collaboration systems sometimes allow two or more users to interact with respect to some electronic document or file. However, known systems fail to utilize object recognition technologies to customize or otherwise improve the collaboration experience of users.

For example, *Multi-User Interaction on Media Facades through Live Video on Mobile Device*, by Boring et al., CHI 2011 Session: Interaction on Mobile Devices (May 7-12, 2011) discusses advances in mobile computing that allows users to interact with media facades.

Further examples include European Patent Application No. 2458537 to Schneider et al., U.S. Patent Application Publication No. 2011/0239135 to Spataro et al., U.S. Pat. No. 8,332,470 to Arun, U.S. Patent Application Publication No. 2011/0225200 to Danis et al., and Canadian Patent Application No. 2547468 to Lusk et al., each of which describe specific systems or methods of collaboration.

Exemplary collaboration systems that are tied to a product in the marketplace include Hewlett Packard's™ Remote Graphics Software, Twiddla's™ collaboration software, and Vyew's™ collaboration and live conferencing products.

All publications referenced herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Unfortunately, the above referenced methods and systems fail to utilize object recognition to improve the collaboration experience of users, and suffer various other shortcomings. For example, Boring et al. requires that the collaborators are all located within camera view of a media façade.

As another example, the Danis reference describes collaboration systems that are configured to define a privacy policy and harvest collaboration data allowable under the privacy policy, the systems require that the privacy policy be defined by a collaborator, while failing to enforce existing policies. Moreover, the method of Danis appears to be limited to defining privacy policies, and fails to define other policies, or harvest collaboration data allowable under other policies.

Thus, there is still a need for improved collaboration systems.

SUMMARY OF THE INVENTION

The inventive subject matter provides apparatus, systems and methods in which an object recognition engine is configured to identify object characteristics from received sensor data, and instantiate a collaboration interface based at least in part on the identified object characteristics.

The instantiated collaboration interface can advantageously be presented to a first user via an electronic device, and be configured to allow a user to edit content associated with the object. The content associated with the object can comprise the representation of the object in the sensor data itself (e.g., an image of the object, an audio recording of the object, a video recording of the object, or other representation of the object as captured by sensor data), content associated with the object retrieved based on the object characteristics (e.g., images, audio, video, text, interactive games, software applications, etc.), the actual object itself or a copy thereof (where the actual object is a data file such as word processing file, spreadsheet file, document file, etc.), and a webpage, audio file, word file, image file, spreadsheet, or other item having content associated with the object.

The collaboration interface can further be instantiated on a second electronic device, and can be configured to allow a second user to edit the content associated with the object, even where the first and second electronic devices are located distally from one another. It is contemplated that in some embodiments the first user can view or listen to an edit by the second user, and vice versa.

Where there is a conflict between a first user's attempted edit and a second user's attempted edit, a reconciliation engine can be coupled with an electronic device and provide an indication of such conflict via the electronic device. Moreover, the reconciliation engine can be configured to reconcile the conflict between the attempted edits, for example, based on a rule associated with the object.

Various objects, features, aspects and advantages of the inventive subject matter will become more apparent from the following detailed description of preferred embodiments, along with the accompanying drawing figures in which like numerals represent like components.

DETAILED DESCRIPTION

Throughout the following discussion, numerous references will be made regarding servers, services, interfaces, databases, engines, modules, clients, peers, portals, platforms, or other systems formed from computing devices. It should be appreciated that the use of such terms is deemed to represent one or more computing devices having at least one processor (e.g., ASIC, FPGA, DSP, x86, ARM, ColdFire, GPU, multi-core processors, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, the Internet, LAN, WAN, VPN, cellular, or other type of packet switched network.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

A system of the inventive subject matter can allow a user to capture an image, audio, text or video data related to an object, and collaborate with a second user in editing content associated with the object. The two or more users can be located in close proximity to one another, or can be located remotely from one another, for example, 1, 5, 10, or even 1,000 or more miles away from one another.

Figure 1:
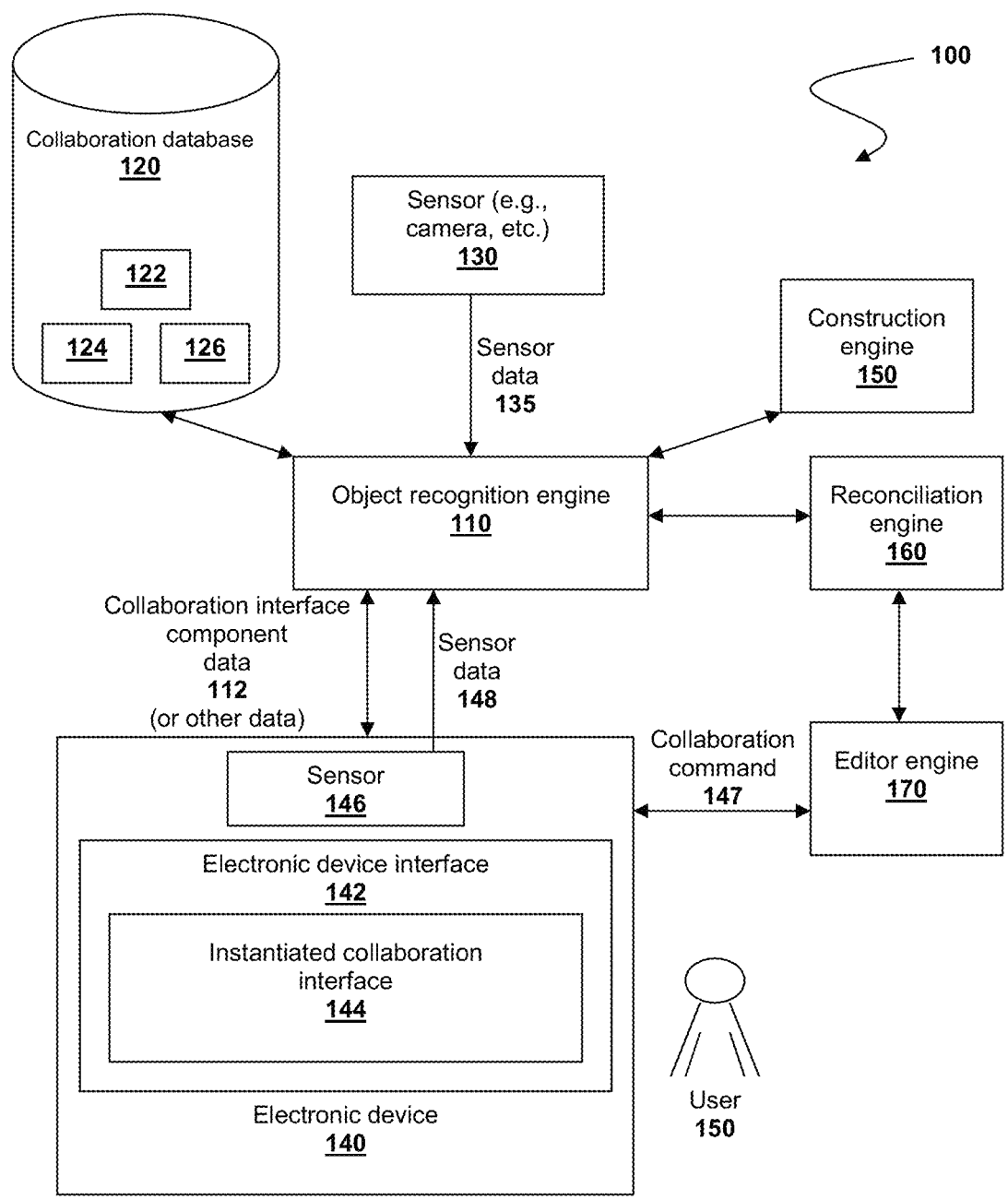
FIG. 1 is a schematic of a system of the inventive subject matter.

FIG. 1 is a schematic of one possible system of the inventive subject matter. System 100 can include an object recognition engine 110 that is communicatively coupled with a collaboration database 120, at least one sensor (e.g., 130 or 146), and an electronic device 140. The system 100 is configured to obtain sensor data 135 related to an object (e.g., data related to a photograph of an object) via an external sensor 130, or sensor data 148 via the electronic device's sensor 146. The various components of system 100 can be communicatively coupled with one or more other components such that the coupled components can exchange data with one another using one or more of the data exchange methods listed above, as well as data exchange connections such as NFC, wired or wireless data connections (e.g., USB, HDMI), WiFi, Bluetooth, data exchange connections internal to components and modules of computing devices, etc.

The example of FIG. 1 is presented as shown for illustrative purposes and ease of understanding. As such, the system 100 should not be interpreted as being limited to only the components as shown in FIG. 1. For example, the system 100 includes a plurality of electronic devices 140, each having their respective system components, to be used by a corresponding plurality of users 150 in a collaboration environment. Similarly, the collaboration database 120 is illustrated with interface components 122, 124, 126 for the purposes of simplicity, but can have any number of interface components across one or more databases 120, as allowed by available storage resources.

Sensor data can be considered to be data representative of the conditions, environment or scene captured by the sensor. Examples of sensor data can include image data (e.g., captured by an image sensor such as in a camera), motion or impact data (e.g., for motion sensors, pressure sensors, gyroscopes, and accelerometers), audio data (e.g., captured by an audio sensor such as a microphone), text, document, application, computer image or other data (e.g., when the sensor is disposed within a computing device), video data (where the sensor comprises a video camera, video data can also include a series or sequence of image data viewable as video), temperature data (e.g., a temperature sensor such as a thermometer), and combinations thereof. The sensor data can be in formats commonly used for the capture and use of data by each particular sensor or sensor type. For example, image data can be in formats such as RAW, JPG, BMP, etc.; audio data in formats such as MP3, WMA, WAV, M4P, etc.; video data can be in formats such as WMV, AVI, MPEG-4, etc.

The electronic device 140 can comprise any commercially suitable device, including for example, a mobile phone, a tablet, a phablet, a computer, game console, appliance, television, or other type of computing device. Preferred electronic devices can comprise an electronic device interface 142, through which an instantiated collaboration interface 144 can be presented to a user. As discussed herein, the electronic device interface 142 can be interpreted as referring to input and output interfaces of computing devices that allow for a user to receive output from the computing device and enter input into the computing device. Examples of interfaces 142 can include a mouse, keyboard, touch screen, stylus, game controller, display screen, audio output (e.g., speakers, headphones, etc.), voice input, motion sensing input, force feedback devices, etc.

The instantiated collaboration interface 144 can be constructed from collaboration interface data 112 obtained via the object recognition engine 110 as a function of the collaboration interface components 122, 124, 126. As used herein, the term "collaboration interface component" can be interpreted broadly to include, for example, content associated with an object, a video editor, image editor, text editor, game editor, audio editor, an Application Programming Interface (API), a Remote Procedure Call (RPC), a website hosting content or other functions, and components thereof (e.g., bars, buttons, sliders, menus, etc. to be included in an editor, that enable a user to use the editing and other collaboration functions of the editor).

In embodiments, a collaboration interface component can be directly related to the identified object and/or content associated with the object. This collaboration interface component can be a separate component (such as an independent editor specific to the content or to the object) or an add-on to an existing editor component. For example, if the object identified is a movie directed by a director having a distinctive visual style, an image editor or video editor that can be used to edit image content or video clips associated with the movie can be modified by collaboration interface components specifically related to the movie, such that the image or video editor included in the instantiated collaboration interface 144 can include edits associated with the director's visual style (e.g., a particular visual filter, distortion of color or shapes, ability to insert explosion effects into any aspect of the content, etc.).

The instantiated collaboration interface 144 as presented to a user can include various editors having input components that can enable a user to edit, manipulate or otherwise interact with content associated with an object via instantiated collaboration interface 144. The instantiated collaboration interfaces 144 and collaboration interface components will be discussed in further detail below.

The content associated with an object can comprise the representation of the object in the sensor data itself (e.g., an image of the object, an audio recording of the object, a video recording of the object, or other representation of the object as captured by sensor data), content associated with the object stored on a database retrieved based on the object characteristics (e.g., images, audio, video, text, interactive games, software applications, etc.), the actual object itself or a copy thereof (where the actual object is a data file such as word processing file, spreadsheet file, document file, etc.). Content can be in the form of image files, video files, word document files, audio files, web pages, spreadsheets, interactive games, text files, software applications, etc. As discussed above, content associated with an object can be stored as a collaboration interface component within collaboration database 120. In embodiments, the content can be stored in one or more separate databases or other non-transitory computer-readable media. In these embodiments, the collaboration interface component corresponding to the content within collaboration database 120 can be an information address, link or other type of information location pointer indicating an electronic or network location of the content as stored in the separate storage media.

The content associated with the object can be of a different modality or content type from that of the sensor data. For example, audio data can be used to recognize a movie playing in the background of an environment where the user device is detecting audio. However, the content data associated with the object (movie) can include video clips, still images from the movie, interactive games, and other content that is not only audio data. In embodiments where the content comprises the object representation within the sensor data, the content can be of a data type extracted from the sensor data. For example, from a video clip having audio, the content data to be used can include songs in audio-only form, pieces of audio dialog separated from the corresponding visual aspect of the video clip, still images taken from the video clip, etc.

Once the user is presented with instantiated collaboration interface 144 via electronic device 140, the user can cause an interaction with (such as desired edit or manipulation) the content associated with an object via a collaboration command 147. The collaboration command 147 can be generated by the electronic device 140 via the instantiated collaboration interface 144, in response to user input corresponding to a content editing collaboration component presented in the instantiated collaboration interface 144. In embodiments, the change to the content represented by the collaboration command 147 can be executed by the instantiated collaboration interface 144 itself. In embodiments, the collaboration command 147 can be obtained from the collaboration interface 144 by an editor engine 170, which can incorporate a change to the content associated with the object in the instantiated collaboration interface 144 as a function of the collaboration command 147. The editor engine 170 can be communicatively coupled with a reconciliation engine 160, which can be configured to reconcile a conflict between two or more collaboration commands 147.

Examples of contemplated collaboration commands 147 include commands to add, delete, modify, insert, review, proofread, crop, clip, speed up, highlight, enlarge, shrink, slow down, distort, skew, rotate, reverse, mirror, superimpose, comment upon, manipulate, replace, create, or otherwise edit content, and add or modify a user comment associated with the content.

The object recognition engine 110 can be configured to obtain sensor data 135,148 from sensors 130,148, where sensor data 135,148 can be representative one or more objects, symbols, or other features in an environment. Object recognition engine 110 can be configured to employ one or more object recognition techniques to recognize the objects in the environment depicted in the sensor data based on identified object characteristics.

Object recognition by a system of the inventive subject matter can utilize features such as scale-invariant feature transform (SIFT), binary robust invariant scalable keypoints (BRISK), and other object recognition technologies. SIFT, BRISK and other suitable object recognition technologies are described in co-owned U.S. Pat. Nos. 7,016,532; 7,477,780; 7,680,324; 7,403,652; 7,565,008; 7,899,243; 7,881,529; and 7,899,252 to Boncyk et al., and U.S. Pat. No. 7,775,437 to Cohen et al., all of which are incorporated herein by reference in their entirety.

For example, image data can be analyzed using one or more object recognition technique to establish one or more image characteristics, which can then be used as an index into an object database storing known objects according to a priori generated image characteristics as described in the above referenced patents. Audio data can be analyzed to recognize words, sounds, music, rhythms, tempo, and other sonic features, which can then be used to recognize objects capable of generating the sounds or related to the sounds and/or recognizing the source of the sound (e.g., a sound coming from a particular movie, etc.). Still further, accelerometer data can represent motion signatures that can be used to identify an activity (e.g., dance, driving, etc.) or a location through integration of acceleration data. Location data such as GPS data can be used, optionally in conjunction with image data, identify a location or building. All possible object recognition techniques and corresponding object characteristics are contemplated.

Object characteristics can be identified directly from sensor data 135 or indirectly from sensor data 135. An example of obtaining object characteristics directly from sensor data 135 can include applying optical character recognition (OCR) algorithms to image data in order to generate one or more words relating to the object. An example of indirectly obtaining the object characteristics includes using the sensor data 135,148 to recognize a known object, then look-up additional information based on references to the known object.

For example, the object recognition engine 110 can receive image data of a movie poster. The object recognition engine 110 can analyze the image data using object recognition techniques to derive image data characteristics, and can use the image data characteristics to identify the poster of the movie. In embodiments, additional information or content associated with the movie depicted in the poster can be retrieved by the object recognition engine 110 based on the identified movie poster, such as editable content or a multi-player game. In embodiments, the type of content retrieved can be based on the image data characteristics used to identify the poster of the movie. In embodiments, the additional information or content associated with the movie can be retrieved based on keywords associated with the movie, which can be obtained via database lookups using image data characteristics, or via techniques such as OCR.

The object recognition engine 110 can be configured to use the derived object characteristics to give rise to one or more collaboration interfaces 144 that allow multiple entities to collaborate with respect to content associated with the recognized object. The object characteristics can be used to construct a query targeting collaboration database 120 storing interface components 122, 124, 126. Such components can be stored according to an indexing scheme based on relevant object characteristic modalities (e.g., image-based attributes, audio attributes, OCR text, indirect characteristics, etc.). In response to the query, collaboration database 120 can return relevant components that can be used to construct the collaboration interface 144.

The collaboration interface 144 can be instantiated according to rules associated with one or more of the users, the computing devices associated with the users, the object being recognized, and the content itself. For example, one user can be deemed responsible for initiating, hosting or otherwise "owning" the collaboration by the object recognition engine 110 (such as based on the user having obtained the sensor data, or initiated the collaboration and invited other users, etc.), and thus have editing privileges not provided to other "guest" users. As such, the instantiated collaboration interface 144 in the hosting user's device may include the full suite of editing functions, whereas the collaboration interfaces 144 for guest user devices can be instantiated with certain functions removed. In another example, where a collaboration interface 144 includes a video editor and the content is a video clip from a movie, the collaboration functions provided to users in the video editor can be restricted based on copyright and other intellectual property rights corresponding to the video clip and/or the movie. In yet another example, the collaboration functions of each component within the interface can be subject to censorship rules. As such, the collaboration interface 144 can be instantiated such that certain video editor functions in the video editor are unavailable to users for this content (e.g., limits on saving or sharing a generated edited clip, limits on the types of edits possible, etc.). In yet another example, the collaboration capabilities of components included in the instantiated collaboration interface 144 can be modified based on the capabilities of one or more of the user devices (e.g., networking capabilities, hardware/software limitations such as processing power, OS used and version, display capabilities, etc.).

Continuing with the previous example of a movie poster, once the poster is recognized by the object recognition engine 110, the collaboration database 120 can be queried and return interface components 122,124,126 that allow multiple users to collaborate with each other to place augmented reality versions of the movie characters in a setting, play a shared game related to the movie, comment on the movie in a review forum discussion, edit clips or still images from the movie, generate ringtones or sound-bites from dialogue in the movie, participate in a promotion associated with a product placed in the movie, or otherwise interact together with content that is made available as triggered by recognition with the poster. More than one of these collaboration options can be instantiated into a single collaboration interface 144, whereby the users can collaborate or interact with multiple content items associated with the movie simultaneously.

In embodiments, the system 100 can include a construction engine 150, which can be configured to construct one or more complete or partial collaboration interfaces to be instantiated on electronic device 140. For example, various collaboration interface components (e.g., 122, 124, 126, etc.) obtained via the collaboration database 120 can be included in a single collaboration interface that is stored in a database for future instantiation. These collaboration interface components for pre-constructed collaboration interfaces can be gathered according to content themes, content types, common collaboration functions for particular content types, common associations between different content types of a same topic or theme, etc. These pre-constructed collaboration interfaces can be considered high-level, and as such, can be considered to be generic templates for possible interfaces to be instantiated. Thus upon instantiation, the collaboration interface can include the interface components of the pre-constructed interface as well as additional interface components that can be specific to the particular content being used (including the content itself), characteristics of the particular collaboration enabled by the individual instantiated collaboration interface, collaboration rules associated with the content and/or one or more of the collaborating users (or their devices), etc.

For example, a pre-constructed interface can comprise a video editor and include a play button, a fast forward button, a rewind button, a stop button, a delete button, an upload interface, a comment button, a speed adjusting slider, a color adjusting slider, and a video display element configured to present a representation of a video. As it is a pre-constructed interface, this interface lacks an association of with any content representative of a recognized sensed object. Upon recognizing an object within received sensor data, the object recognition server 110 can obtain the pre-constructed collaboration interface via construction engine 150 (or database storing the constructed collaboration interfaces) and further instantiate it with one or more interface components from the collaboration database 120 corresponding to the content associated with the sensed object. Based on rules associated with one or more of the content, the collaborating users, and the respective users' devices, one or more of the components of the video editor can be modified or removed, such that the collaboration functions associated with those components are restricted or eliminated from use by one or more of the users.

System 100 can also optionally be coupled with a reconciliation engine 160, which is configured to provide an indication of a conflict between two or more collaboration commands and is described in further detail below.

While the sample system 100 illustrated in FIG. 1 depicts the object recognition engine 110, the collaboration database 120, the construction engine 150, the reconciliation engine 160 and the editor engine 170 as external to the electronic device 140, it is contemplated that, in embodiments, one or more of the object recognition engine 110, the collaboration database 120, the construction engine 150, the reconciliation engine 160 and the editor engine 170 can be integral to the electronic device 140 that instantiates the collaboration interface 144.

In embodiments, the collaboration interface 144 can be instantiated by the object recognition engine 110 (or caused to be instantiated by the engine 110) externally from the electronic device 140, such as in a dedicated server or other computing device, and provided to the electronic device 140. In one aspect of these embodiments, the collaboration interface 144 can be instantiated externally from the electronic device 140 and then communicated to the electronic device 140 for instantiation within the device 140. In another aspect of these embodiments, the collaboration interface 144 can be instantiated externally from the device 140 and presented to the device 140 via a virtualized interface, such that the device 140 only serves to present the interface 144 to the user and receive user input related to the collaboration. In these embodiments, the computing device instantiating the collaboration interface 144 is communicatively coupled with the object recognition engine 110, electronic device 140 and any other user devices such that the collaboration interface 144 is presented to and allows interaction from the user via electronic device interface 142.

Figure 2:
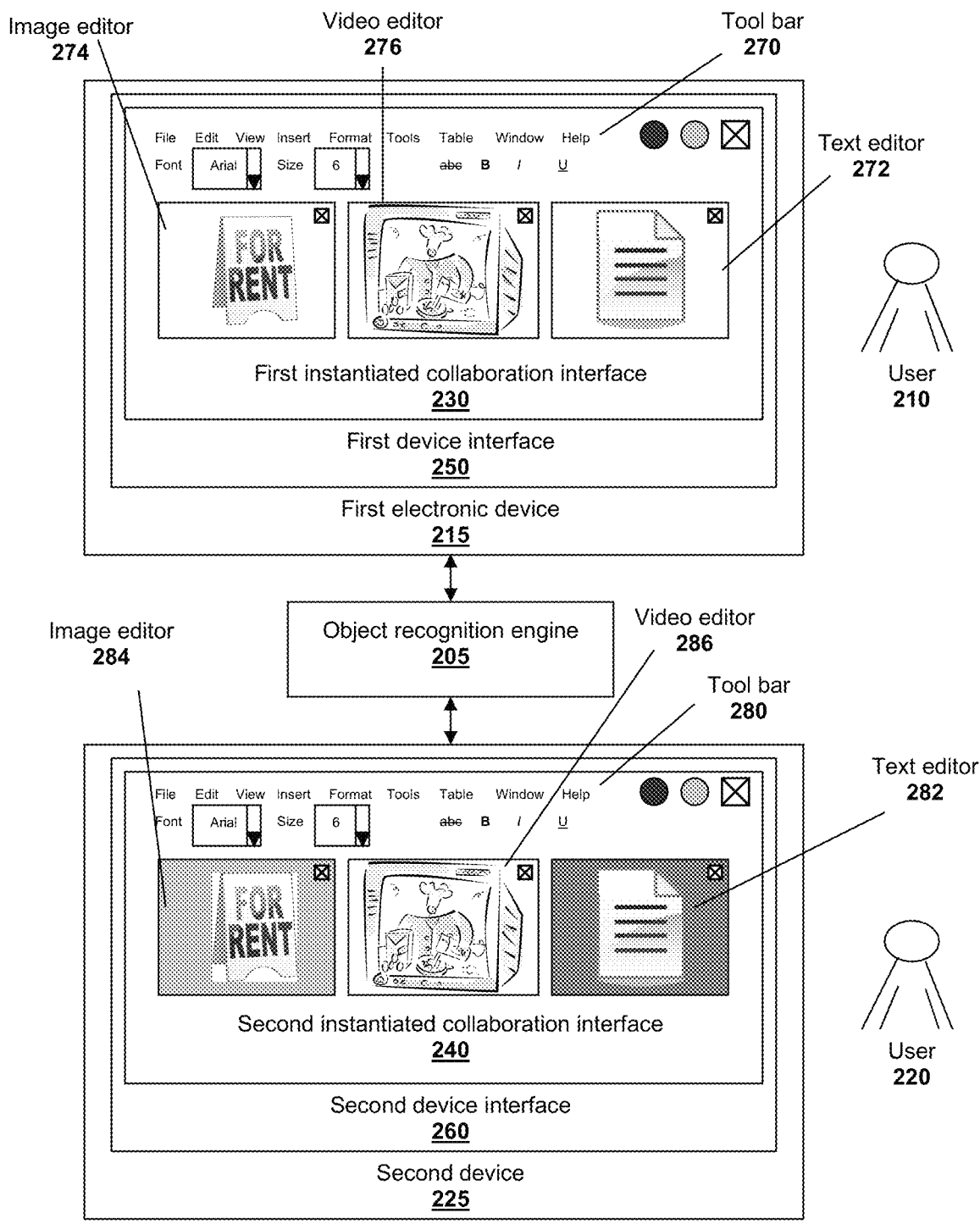
FIG. 2 is a schematic showing the construction of a collaboration interface.

FIG. 2 is a schematic showing the construction of a collaboration interface. FIG. 2 also illustrates example components of an instantiated collaboration interface. For purposes of this example, it should be presumed that user 210 has captured an image of a "for rent" sign via a camera-enabled first electronic device 215 and caused sensor (i.e. image) data to be transmitted to object recognition engine 205. It should also be presumed that user 220 has captured a video/audio representation of a cooking show via a video-camera enabled second electronic device 225 and caused sensor (video and audio) data to be transmitted to object recognition engine 205, and has selected a text file saved on second electronic device 225 and caused text data (corresponding to "sensor data" for the purposes of the functions carried out by the object recognition engine) to be transmitted to object recognition engine 205.

The object recognition engine 205 of FIG. 2 can correspond to the object recognition engine 110 of FIG. 1. Likewise, the user devices 215,225 having instantiated collaboration interfaces 230,240 and device interfaces 250,260, respectively, can each correspond to the electronic device 140, instantiated collaboration interface 144, and electronic device interface 142 of FIG. 1.

Upon receiving sensor data via the first or second electronic devices (215, 225), sensor data from an external sensor (such as sensor 130 in FIG. 1) or upon selection of sensor data stored in one of the electronic devices or in another storage location to be incorporated into one or more collaboration interfaces 230,240, the object recognition engine 205 can be configured to identify a set of object characteristics from the sensor data by using one or more object recognition techniques, and select a set of collaboration interface components having selection criteria satisfied by the object characteristics to be included within the instantiated collaboration interfaces 230,240 on the first and second electronic devices (215, 225), respectively. As discussed above, collaboration interface components within the selected set can include the content associated with the identified object that will be the subject of the collaboration. One or both of the instantiated interfaces 230,240 can also comprise a representation of the object obtained, or other content, by the object recognition engine 205.

It is contemplated that the sensor data and/or content data associated with the identified object (e.g., image data, video/audio data, text data, other content associated with the sign, cooking show and/or text document) can be used to instantiate a single collaboration interface on one or more electronic devices (as shown in this example), or can be used to instantiate two or more collaboration interfaces on one or more electronic devices simultaneously or sequentially.

As the object recognition engine 205 is communicatively coupled with first electronic device 215 and second electronic device 225, the object recognition engine 205 can cause the instantiation of the collaboration interfaces 230, 240 in the respective device. The first collaboration interface 230 is instantiated in the first device 215, and presented to the user 210 via a first device interface 250 of first electronic device 215. The second collaboration interface 240 is instantiated in the second device 225, and presented to the user 220 via second device interface 260 of second electronic device 225.

As previously mentioned, an instantiated collaboration interface can comprise various components, including for example, a video editor, image editor, text editor, game editor, audio editor, bars (e.g., minimizer, maximizer, zoom in, zoom out, etc.), buttons, sliders, menus, any suitable graphical user interface element (GUI element), or any other suitable components. It is contemplated that all of the components of an instantiated collaboration interface can be obtained via one or more databases (such as one or more collaboration databases 120).

In the example illustrated in FIG. 2, the first instantiated collaboration interface 230 and second instantiated collaboration interface 240 generally comprise similar interface components, selected based on having selection criteria satisfied by the object characteristics. For example, the object characteristics identified from the image data can have selection criteria requiring that a component is suitable for editing an image. Thus, the components identified for instantiation would be suitable for performing such edits.

Each instantiated collaboration interface comprises some of the same components, for example, a tool bar (270, 280), minimizer and maximizer buttons, a close button, font adjusters, an image editor (274, 284), video editor (276, 286), and text editor (272, 282). However, the first instantiated collaboration interface 230 and second instantiated collaboration interface 240 can include differences, even within similar interface components.

For example, image editor 274 and image editor 284 each comprise a website associated with the for rent sign captured by user 210, and various optional components such as a color palette drop down menu, a website navigation menu, a slider bar that allows a user to adjust the size of the representation or other item of the editor, as well as any other component that can generally be found in a Microsoft™ Paint, Microsoft™ Word or other similar program. The website associated with the "for rent" sign can be an apartment management company's website that provides images, prices, and specs associated with the apartment displaying the for rent sign.

The differences between collaborations interfaces 230 and 240 can be generated based on user preferences, user access permissions, user collaboration hierarchy (e.g., the user initiating the collaborations, the user that 'owns' or is hosting the collaboration, etc.), user content ownership, user content access permissions, user profiles, user device capabilities, and other factors.

FIG. 2 illustrates possible differences between the collaboration interfaces 230,240. In this example, the image editor 274 is considered to comprise full image editing capabilities, while image editor 284 is considered to comprise partial editing capabilities (represented in FIG. 2 as the "grayed out" background of image editor 284). As such, image editor 274 can allow user 210 to perform the full suite of image editing functions which can include adding a comment on the representation, modifying a font, text, color, size or other appearance of the representation, cropping the representation, rotating the representation, inserting audio comments, inserting video comments, and so forth. However, image editor 284 can be restricted to allow user 220 (or other user) to add textual, audio or video comments.

As another example, text editor 272 and text editor 282 also generally comprise the same components, including a digital representation of the document selected by user 220. However, user 220 is completely blocked from making any edits to the representation via text editor 282 (again represented by the "grayed out" background within text editor 282), while user 210 can utilize the various text editor components included in text editor 272 to edit the representation.

The preceding description in relation to FIG. 2 describes content editing where the content to be edited can comprise a representation of the object (as depicted in the sensor data), content associated with the object that is retrieved by the object recognition engine (such as from a collaboration interface component from a collaboration database), or content included in a webpage or other item presented via an instantiated collaboration interface. Much of this description is also applicable where the content to be edited comprises the object itself. For example, a text document can be identified from a captured image depicting a computer screen having the text document visible within the computer screen. In this example, the identified text document can be the object recognized by the object recognition engine, and upon recognition, can also be the content that is edited by collaborating users. It is also contemplated that content editing where the content comprises the object itself can be achieved utilizing, among other things, technology described in U.S. Pat. No. 7,564,469 to Cohen.

As shown in FIG. 2, video editor 276 and video editor 286 comprise the same components, and can be utilized by users 210 and 220 (or other users having access to first or second electronic devices (215, 225) to perform various edits. These components include a digital representation of the video captured by user 220, an audio file uploading component, a play button, a fast forward button, a rewind button, a slow button, a pause button, a close button, or any other suitable component. Suitable components can include those included in Movavi™ products and other video editing software.

Once user 210 or user 220 have completed their collaboration (i.e., directed an electronic device to generate 0, 1, 5, 10, or even 50 or more collaboration commands via the instantiated collaboration interface), it is contemplated that one or more of the versions of the collaborated-upon, edited content (i.e., before and after any single edit, including the final version) can be saved to one or more of the electronic devices, sent to an email address, sent other devices via MMS or text message, saved in a database communicatively coupled with the object recognition engine, modified further according to additional collaboration commands, uploaded to a website for sharing or publication (e.g., via social networking sites, video hosting sites, etc.), and/or deleted. The actions to be taken on edited content can be based on a user preference or default action, and can be based upon rules associated with the content or object restricting the use of the content pre- and post-modification.

It is contemplated that one set of sensor data (e.g., video/audio data from a captured video/audio) can be used to instantiate a collaboration interface having collaboration components directed to different items of content. This can be automatic, or in response to a user request.

In an embodiment illustrating one example of using one set of sensor data to instantiate a collaboration interface with collaboration components using different items of content, the collaboration components can be directed to items of content that are separated versions of a combined item of content. For example, a user may wish to have two interfaces shown side by side with respect to a single audio/video recording of a car speeding down a street. One component can be used to edit a video aspect (i.e., the captured moving imagery), and the other component can be used to edit an audio aspect (i.e., the captured sound). The user can enter a command or request when the video content is selected (in embodiments where the content is retrieved, such as from the component database 120) or capturing the video/audio data (e.g., in embodiments the content to be used is object representation within the captured sensor data) that an audio editor and a video editor be instantiated in two separate interfaces. Alternatively or additionally, the system can be configured to implement a default rule that where received sensor data comprises two or more different types of data, a separate interface shall be provided for each type.

In an embodiment illustrating a second example of using one set of sensor data to instantiate a collaboration interface with collaboration components using different items of content, the object recognition engine 110 can recognize multiple objects represented in a single set of sensor data, and the components of the instantiated collaboration interface can individually apply to each recognized object. For example, if the sensor data is captured video data that includes a clip of a television show, and the clip of the television show depicts a character driving a particular car, the object recognition engine 110 can recognize the television show as an object and the car within the show as another object. As such, the collaboration components can be related to (and include) content and components associated with each of the TV show and the car. For example, the instantiated collaboration interface 144 can include a video editor allowing a user to edit clips of the TV show, and a modeling application that allows the user to build their own version of the car (including options, color, etc., such as for a prospective purchase).

In embodiments, the items of content associated with individual collaboration components, such as the "for rent" sign, the cooking show clip and the text file of FIG. 2 can be linked, such that collaboration commands applying to individual collaboration components (e.g., the image editor, video editor, and text file editor) can be linked to one or more of the other collaboration components, whereby the editing effect of a collaboration command on one item of content has an associated effect with a second item of content.

In one example, the video editor can allow for the insertion of the "for rent" sign representation into the video clip of the cooking show, such that in exterior shots of the cooking show, the host's house can now appear to be for sale. As the image of the "for sale" sign is edited in the image editor 274, the appearance of the sign in the video can be similarly changed by the video editor 276. Similarly, the image of the "for sale" sign or a clip of the video can be embedded into the text document, wherein changes in the image file performed with the image editor 274 or the video file by using the video editor 276 can result in corresponding changes of the image or video clip embedded into the document file being edited in text editor 272. Likewise, the video can be edited by embedding comments at particular parts of the video using editor 276, with corresponding links or citations to the video added to the text document using text editor 272. As such, as the text editor 272 is used to edit the section of the document including the comment to be displayed in the video, the video editor 272 can update the text at the corresponding parts of the video clip to display the updated version of the comments.

Figure 3:
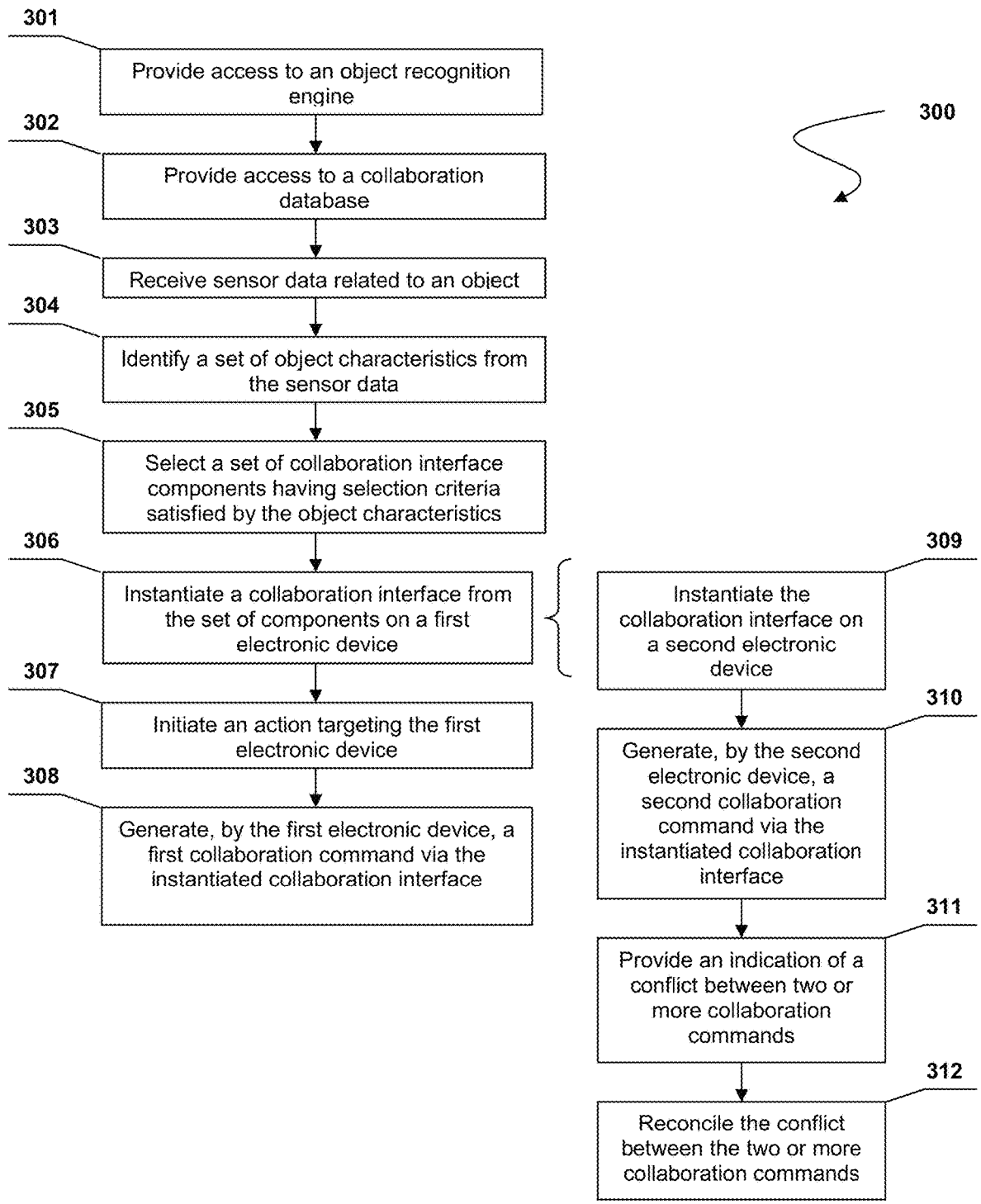
FIG. 3 is a flowchart illustrating a sample method of the inventive subject matter.

FIG. 3 is a flowchart illustrating a method 300 implementing functions and processes to enable the collaboration of one or more users according to the inventive subject matter. The method described in FIG. 3 can be implemented, for example, via the system illustrated in FIGS. 1 and 2.

At step 301, the system 100 can provide access to an object recognition engine, such as engine 110, to one or more users, such as user 150. This access can be provided via a communicative coupling between an electronic device 140 accessible to a user and the other components of the system (e.g., engine 110, engines 150,160, 170, and other components such as computing devices or modules that can handle any registration and login functions of a particular system). The access to the object recognition engine 110 can be provided via an application downloaded to the electronic device 140, via a website access via a browser on electronic device 140, etc. The access to the object recognition engine 110 and other components of the system 100 to access the collaboration functions enabled by the inventive subject matter can be subscription or payment-based, and can require user authentication, such as by the entry of a user identifier and a password for the user.

At step 302, the system 100 provides access to a collaboration database, such as collaboration database 120, storing collaboration interface components such as components 122,124,126. It is also contemplated that the system 100 can provide access to other database(s), including, for example, databases storing sensor data, digital representations of objects, content associated with objects, edited representations, edited content associated with objects, user uploaded electronic files, or any other data associated with a device or user. Additional databases can also include databases associated with registration/verification/login functions, databases associated with object recognition functions, etc. In embodiments, the access provided at step 302 can be provided simultaneously with the access to the object recognition engine 110 provided step 301. In embodiments, the access to various databases can be provided on an "as needed" basis, wherein access is only provided at the time that data or information from the various databases is needed to carry out functions and processes associated with the inventive subject matter and other functions of system 100.

At step 303, the object recognition engine 110 can receive sensor data representative of one or more objects as detected by one or more sensors. The sensor can be a sensor 146 internal to a user's electronic device 140 or an external sensor 130. As discussed above, contemplated sensor data can include image data, text data, video data, audio data, etc. Examples of objects represented by sensor data can include billboard signs, television shows, movies, advertisements, documents, PDFs, spreadsheets, photographs, sculptures, geographic locations, images, music, YouTube™ clips, an X-ray image, a CT scan image, a fashion item, a combination thereof, or any other physical (real-world) or digital object can be photographed, video recorded, audio recorded, downloaded, or otherwise captured by a sensor.

At step 304, the object recognition engine 110 uses one or more object recognition techniques to identify (e.g., directly, indirectly or both) a set of object characteristics (e.g., characteristics of or relating to the object, characteristics of or relating to the type of sensor data obtained, etc.) from the sensor data related to an object represented by the sensor data. The object characteristics can include one or more of a sound, a motion, a color, a size, a curvature or other characteristic of the object, a sensor data type identifier (e.g., identifying the sensor data as image data, video data, audio data, text data, etc., and including the identification of the sensor data as a combination thereof), a characteristic of the sensor data itself, and other type of data.

At step 305, the object recognition engine 110 selects one or more collaboration interface components 122,124,126 from the collaboration database 120 based on one or more of the object characteristics, from which a collaboration interface can be instantiated. In embodiments, the collaboration interface components can be selected based on selection criteria satisfied by the object characteristics. In further embodiments, the collaboration interface components can be selected based on a mapping of one or more object characteristics to one or more collaboration interface components, wherein the mapping serves to satisfy selection criteria. In other words, an interface component can be selected based on its suitability for use with content, such as allowing a desired edit to be made to content related to an object. For example, where the object characteristic identifies the content related to the object as audio data, a selected collaboration interface component can comprise, among other things, a vocal reducer, a voiceover application, a noise reducer, a silencer, amplifier, normalizer, equalizer, echo slider, or a ringtone generating application. As another example, where the object characteristic comprises curvature data of an object, a selected collaboration interface component can allow a user to edit the curvature of the object.

As discussed above, in embodiments, the collaboration interface components can include the content itself that is to be the subject of the collaboration. In embodiments, the content can be the representation of the object within the sensor data itself.

As described in step 306 and in the description above, the object recognition engine 110 can then cause the instantiation of a collaboration interface on an electronic device 140 from the set of collaboration interface components.

At step 307, the object recognition engine 110 can initiate an action targeting one or more user electronic devices 140 prior to configuring the device(s) to generate a collaboration command as described in step 308. The initiated action can comprise a synchronizing action (e.g., to synchronize the devices participating in the collaborative environment), a network test action, an updating action (e.g., such as to update a device's software application to the most current version for use, to update content to a new version, etc.), a phone call (e.g., to technical support where the object comprises a broken or otherwise non-functioning wireless router, to alert a user that the collaboration is about to begin, etc.), a text message (e.g., to provide devices with copies of the sensor data originally used to select collaboration components for use in the collaboration, such as where a user captures an image of a television screen showing an American Idol™ contestant, etc.), a software process (e.g., a download of an Angry Birds™ mobile application where the object comprises a Angry Birds™ magazine advertisement or QR code therein, etc.), or any other suitable action that can be useful to a collaboration with respect to an object.

At step 308, the first electronic device 140 generates a first collaboration command (such as collaboration command 147 of FIG. 1) via the instantiated collaboration interface 144, corresponding to a requested edit to the content, such as an edit entered by the user via the device interface 142. The first collaboration command 147 can allow the user to view the requested edit performed via a collaboration interface component via an electronic device. The generation of the collaboration command can be automatic upon an input of an edit by a user, or can require an action by a user or system of the inventive subject matter (such as a confirmation action or authorization action). In embodiments, the edit corresponding to the collaboration command 147 can be provided to an editor engine 170 and executed by the editor engine 170.

For example, where a user inputs edit selections to delete 5 seconds of an audio clip via an audio or music editor component of an instantiated collaboration interface 144, the object recognition engine 110 can automatically generate a collaboration command to delete the audio clip in the instantiated collaboration interface(s). Alternatively, the system can, among other things, require that a second user approve of the deletion via an instantiated collaboration interface prior to generating the command, or generate (or not generate) the command in accordance with a rule associated with the object.

Contemplated rules associated with an object can be stored in a database communicatively coupled with an object recognition engine, and can include, for example, a rule that governs instantiation and operation of the instantiated collaboration interface, a copyright rule, a trademark rule, a patent rule, a contract rule, a language rule, an intellectual property rule, a privacy rule, a censorship rule, or a version control rule. One or more of the rules can be enforced via at least one of the object recognition engine and the instantiated collaboration interface. In this manner, a system can be used to enforce a right associated with an object (e.g., person, copyrighted work, trademark, etc.).

For example, a user may wish to capture an image of an image of Catherine Zeta Jones, and utilize a system of the inventive subject matter to edit the image with a friend. While certain edits to a representation of the image of Catherine Zeta Jones may be allowable by a rule (e.g., as a fair use), other edits may be restricted by a copyright rule or moral rights rule. Thus, the system may allow the user to comment upon the image of Catherine Zeta Jones, while restricting a conversion of the image into grayscale.

In some embodiments of the inventive subject matter, the collaboration interface(s) instantiated in step 306 can also be instantiated on a second electronic device (a second electronic device 140) to allow a collaboration between two or more users, as described in step 309. As illustrated in FIG. 2, the same or similar collaboration interfaces can be instantiated on multiple user devices, allowing for the collaboration by multiple users. The collaboration interfaces can differ from user to user, as discussed above with regard to user collaboration/access rules and permissions.

At step 310, the second electronic device generates a second collaboration command via the collaboration interface instantiated on the second electronic device, as described in step 310. In such embodiments, a conflict may arise between a first collaboration command and a second collaboration command.

In embodiments, the object recognition engine 110 can target an action targeting the second electronic device in the same way that the first electronic device is targeted at step 307, prior to the execution of step 310.

A reconciliation engine 160 that is communicatively coupled to the object recognition engine 110 can be configured to provide an indication of a conflict between two or more collaboration commands from two different users, as executed at step 311. A conflict can be detected by the reconciliation engine 160 when conflicting commands are received Where such an indication is provided, it is contemplated that the two or more users can determine which command to generate or incorporate into an instantiated collaboration interface or representation. This determination can be via a vote, via a suggested alternative command to one or more of the users, via a selection of a recommended command among the conflicting commands, etc. In embodiments, the determination can be single-handedly made by a user according to a hierarchy of users in the collaboration, whereby the option to determine the command to generate and implement can be decided by the single user of a highest hierarchy (e.g. hosting user, initiating user, sensor data gathering user, content owner, etc.).

At step 312, the reconciliation engine 160 reconciles the conflict (i.e., performs revision control and conflict resolution). This reconciliation can be performed via a centralized revision control system (e.g., file locking, version merging, collaboration command prioritizing and synchronization etc.) distributed revision control, integrated version control support, or any other suitable model or system of version control.

In embodiments, the conflict can be reconciled by the reconciliation engine 160 without first providing the indication of the conflict of step 311. In these embodiments, the reconciliation engine 160 automatically resolves any detected conflicts according to reconciliation rules and/or criteria.

A reconciliation performed by the reconciliation engine 160 of the inventive subject matter can be based at least in part on one or more of the sensor data received by the object recognition engine 110, a rule associated with an object captured by the sensor data, the object characteristics identified from the sensor data, a rule associated with the content associated with the captured object, and one or more collaboration interface components from which the collaboration interface is instantiated. For example, a rule governing a reconciliation can require that a command generated via the electronic device on which the collaboration interface is first instantiated has a higher priority than a command generated via second, third, or later devices. As another example, a rule governing a reconciliation can require that a command generated by the electronic device that is located nearest to a sensor that transmitted sensor data related to the object to the object recognition server has the highest priority. As yet another example, a rule governing a reconciliation can require that a command correlating to an edit by the user who initiated the collaboration (e.g., first caused sensor data to be transmitted to the object recognition engine, etc.) has priority over all other commands.

An example of a reconciliation of a conflict between two collaboration commands is described in the following use case. Lisa is studying in her UNC dorm room and wants to play a game of chess with Lindsey who is at a coffee shop in Boston. Lisa takes a picture of a chess board and a chess piece with her cell phone, and transmits the image data to an object recognition engine that is implemented on her cell phone as part of a mobile application. The object recognition engine identifies a set of object characteristics from the image data related to the chess board, and a second set of object characteristics from the image data related to the chess piece. The object recognition server then selects a set of collaboration interface components having selection criteria satisfied by both set of object characteristics and a collaboration interface is instantiated on Lisa's cell phone from the selected set of collaboration interface components.

In this example, the instantiated collaboration interface comprises representations of: a chess board; 1 white king piece; 1 black king piece; 1 white queen piece; 1 black queen piece; 2 white rook pieces; 2 black rook pieces; 2 white bishop pieces; 2 black bishop pieces; 2 white knight pieces; 2 black knight pieces; 8 white pawn pieces; and 8 black pawn pieces. Each representation of a piece is located in the appropriate starting position of the representation of the chess board. The instantiated collaboration interface also comprises two arrows, each of which can be used to select a chess piece and move it to a different position.

Lisa inputs a request via the mobile application to invite Lindsey via a text message to her cell phone and an instant message to her Facebook™ and Gmail™ accounts. Lindsey accepts the request, and the instantiated collaboration interface is further instantiated on Lindsey's computer.

Lisa uses one arrow to select a white pawn piece and moves it diagonally to the right. Lindsey simultaneously selects the same white pawn piece and moves it diagonally to the left. Thus, Lisa's cell phone shows the selected white pawn piece in one location while Lindsey's computer shows it in a different location. Each device receives an alert indicating the conflict, and the conflict is automatically reconciled according to a default rule that the first player controls the white pieces and the second player controls the black pieces. Thus, the white pawn represented on Lindsey's device is automatically moved two spaces to the right.

Another example of a reconciliation is described in the following use case. Architect Valerie and interior designer Vanessa are working on an addition to Melissa's house in Connecticut. Valerie has created a blueprint of what the addition currently looks like and Vanessa would like to remotely view the blueprint so that she can determine how much space she has to work with.

Valerie transmits an electronic file comprising sensor data related to the blueprint to an object recognition engine of the inventive subject matter via her computer. Based in part on the received sensor data, the object recognition engine identifies object characteristics from the image and instantiates a collaboration interface on Valerie's computer, the interface comprising a three dimensional model of the blueprint objects, a view adjuster, a drawing tool, an image uploading tool, a color palette, a zoom function, a crop tool, and an expansion tool.

As described above, these components can be selected from a collaboration database communicatively coupled with the object recognition engine. If Valerie wants to remove a component of the instantiated collaboration interface, it is contemplated that she can simply click on a symbol related to the component. If Valerie wants to add a component to the instantiated collaboration interface, it is contemplated that she can be presented with optional components to select from and move to a desired location within the interface.

Valerie, satisfied with the originally instantiated collaboration interface components, sends a request to the object recognition engine to instantiate the same collaboration interface on Vanessa's computer. The object recognition engine sends a link to Vanessa's email address from which Vanessa opens the instantiated collaboration interface.

Valerie and Vanessa, viewing substantially identical collaboration interfaces, make various edits to the three dimensional model representative of changes they wish to make on Melissa's addition. For example, Valerie utilizes the expansion tool to expand a game room of the three dimensional model. Viewing this change, Vanessa utilizes an image uploading tool to add a representation of a sectional to the game room. Thus, using a system of the inventive subject matter, Valerie and Vanessa can collaborate with one another remotely to achieve the best architecture and design combination for Melissa.

Other contemplated uses for systems of the inventive subject matter include, among other things, telemedicine, retail activities, design activities, training activities, or education.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A collaborative augmented reality (AR) content management system comprising:

at least one computer readable, non-transitory memory storing software instructions;

at least one collaboration database capable of storing AR-related components indexed at least by location characteristics; and at least one processor coupled with the memory and with the collaboration database and, upon execution of the software instructions, performs the operations of:

determining at least one object characteristic including an object location of at least one recognizable object associated with a first device location;

receiving a selected AR-related component from a user and associated with the at least one recognizable object, the AR-related component comprising a reconciliation control over the at least one recognizable object, wherein the reconciliation control is based on a priority;

storing the selected AR-related component in the collaboration database according to at least the object location as a relevant AR-related component;

enabling a second device to obtain the relevant AR-related component from the collaboration database upon satisfaction of selection criteria satisfied by a second device location of the second device and based on the object location; and enabling the second device to superimpose the relevant AR-related component on a display of the second device according to the reconciliation control.

2. The system of claim 1, wherein the AR-related component comprises a command.

3. The system of claim 2, wherein the command comprises a superimpose command.

4. The system of claim 2, wherein the command comprises at least one of the following commands related to content associated with the at least one recognizable object: an add command, a delete command, a modify command, an insert command, a review command, a proofread command, a crop command, a clip command, a speed up command, a highlight command, an enlarge command, a shrink command, a slowdown command, a distort command, a skew command, a rotate command, a reverse command, a mirror command, a comment upon command, a manipulate command, a replace command, or a create command.

5. The system of claim 1, wherein the AR-related component allows an addition of content or a modification of content associated with the at least one recognizable object.

6. The system of claim 1, wherein the AR-related component comprises content related to the at least one recognizable object.

7. The system of claim 6, wherein the content related to the at least one recognizable object includes at least one of the following: an image, a video, audio, text, a game, or a software application.

8. The system of claim 1, wherein the AR-related component comprises a version control over the at least one recognizable object.

9. The system of claim 1, wherein the at least one object characteristic further includes one or more of the following: a characteristic obtained from an object recognition algorithm, a sonic feature, an acceleration, text from an optical character recognition algorithm, and an image attribute.

10. The system of claim 1, wherein the at least one recognizable object comprises one or more of the following: a building, a poster, a billboard, a sign, a television show, a move an advertisement, a document, a photograph, a sculpture, or a magazine.

11. The system of claim 1, wherein the AR-related component includes one or more of the following: an image editor, a video editor, a text editor, a game editor, an audio editor, an application program interface, a remote procedure call, or a content hosting function.

12. The system of claim 1, wherein the object location is based at least in part on global positioning system data.

13. The system of claim 1, wherein the AR-related component comprises a conflicting command relative to other AR-related components related to the at least one recognizable object at the object location.

14. The system of claim 13, wherein the operations further include reconciling the conflicting command according to reconciliation rules comprising the reconciliation control.

15. The system of claim 14, wherein the reconciliation rules are based on the priority.

16. The system of claim 1, wherein the AR-related component comprises a collaboration interface component.

17. The system of claim 1, wherein the operations further include generating an alert on the first device or the second device regarding collaboration with respect to content related to the at least one recognizable object.

18. The system of claim 17, wherein the alert indicates a conflict associated with the collaboration interface component.

19. The system of claim 17, wherein the alert comprises a text message.

20. The system of claim 17, wherein the alert indicates that a collaboration is about to begin.

21. The system of claim 1, wherein the relevant AR-related component is part of an interactive game.

22. A non-transitory computer-readable medium having computer instructions stored thereon, which, when executed by at least one processor, cause the at least one processor to perform the operations of:

determining at least one object characteristic including an object location of at least one recognizable object associated with a first device location;

receiving a selected AR-related component from a user and associated with the at least one recognizable object, the AR-related component comprising a reconciliation control over the at least one recognizable object, wherein the reconciliation control is based on a priority;

storing the selected AR-related component in the collaboration database according to at least the object location as a relevant AR-related component;

enabling a second device to obtain the relevant AR-related component from the collaboration database upon satisfaction of selection criteria satisfied by a second device location of the second device and based on the object location; and enabling the second device to superimpose the relevant AR-related component on a display of the second device according to the reconciliation control.

23. A method of collaborative augmented reality (AR) content management, the method comprising:

determining at least one object characteristic including an object location of at least one recognizable object associated with a first device location;

receiving a selected AR-related component from a user and associated with the at least one recognizable object, the AR-related component comprising a reconciliation control over the at least one recognizable object, wherein the reconciliation control is based on a priority;

storing the selected AR-related component in the collaboration database according to at least the object location as a relevant AR-related component;

enabling a second device to obtain the relevant AR-related component from the collaboration database upon satisfaction of selection criteria satisfied by a second device location of the second device and based on the object location; and enabling the second device to superimpose the relevant AR-related component on a display of the second device according to the reconciliation control.

* * * * *